(12) United States Patent
Rapp et al.

(10) Patent No.: US 7,849,392 B2
(45) Date of Patent: Dec. 7, 2010

(54) SYSTEMS AND METHODS FOR GENERATING TECHNICAL DOCUMENTATION FROM ENTERPRISE SERVICE-ORIENTED ARCHITECTURE CONTENT

(75) Inventors: Roman Rapp, Villeneuve Loubet (FR); Martin Kaisermayr, Antibes (FR)

(73) Assignee: SAP AG, Walldorf (DE)

( * ) Notice: Subject to any disclaimer, the term of this patent is extended or adjusted under 35 U.S.C. 154(b) by 887 days.

(21) Appl. No.: 11/783,835

(22) Filed: Apr. 12, 2007

(65) Prior Publication Data

US 2008/0215957 A1 Sep. 4, 2008

(30) Foreign Application Priority Data

Feb. 28, 2007 (EP) .................. 07290271

(51) Int. Cl.
*G06F 15/00* (2006.01)
(52) U.S. Cl. .................... 715/200
(58) Field of Classification Search .......... 715/200
See application file for complete search history.

(56) References Cited

U.S. PATENT DOCUMENTS 5,884,317 A * 3/1999 Cline et al. ............... 1/1
6,272,508 B1 * 8/2001 Dyne et al. ............ 715/210
7,630,965 B1 * 12/2009 Erickson et al. ............ 1/1
2004/0201600 A1 * 10/2004 Kakivaya et al. ........ 345/700
2005/0108279 A1 * 5/2005 Di Giuliani ........... 707/103 R
2005/0216891 A1 * 9/2005 Sundararajan et al. ..... 717/123

FOREIGN PATENT DOCUMENTS

WO WO 03/083600 A2 10/2003

OTHER PUBLICATIONS

Gelbard, et al., "Integrating system analysis and project management tools," International Journal of Project Management, vol. 20, p. 461-468, copyright 2002, Elsevier Science Ltd.*
Brittenham, et al., "Understanding WSDL in a UDDI Registry: How to Publish and Find WSDL Service Descriptions", Version 1.0, IBM, Aug. 2001, p. 1-40.*
Thilloy, "SOA in the Enterprise: A Survey of the Technical Landscape", published Aug. 2006, SOA Magazine Issue I, p. 1-10.*

* cited by examiner

*Primary Examiner*—Amelia Rutledge
(74) *Attorney, Agent, or Firm*—Finnegan, Henderson, Farabow, Garrett & Dunner, LLP

(57) ABSTRACT

Systems and methods are provided for generating technical documentation from content, such as enterprise SOA content. In one implementation, a computer-implemented method is provided that comprises receiving an identifier of a service interface description that defines an interface for implementing a service and processing one or more packages associated with the service interface description by reading data from one or more files of enterprise SOA content stored in a database. In addition, the method generates the technical documentation using the data read from the one or more files.

24 Claims, 7 Drawing Sheets

SYSTEMS AND METHODS FOR GENERATING TECHNICAL DOCUMENTATION FROM ENTERPRISE SERVICE-ORIENTED ARCHITECTURE CONTENT

BACKGROUND

I. Technical Field

The present invention generally relates to the field of data processing and to systems and methods for generating technical documentation. More particularly, the invention relates to computerized systems and methods for generating technical documentation from, for example, enterprise service-oriented architecture (SOA) content.

II. Background Information

In an enterprise, the term "service-oriented architecture" (SOA) refers to an architecture that provides a collection of services that may communicate with each other. A "service" is a programmable, self-contained, self-describing, modular application function that can be published, discovered, or invoked through an open Internet standard. Each service is typically self-contained and the services are made available to users in the enterprise via a distributed system architecture. The services may be, for example, Web based and available over Internet protocols. Furthermore, the services that are provided in an enterprise SOA are typically defined in a standardized, but technical manner. That is, the services are defined using a particular programming language, such as the Web-Service Definition Language (WSDL). WSDL is an XML format that describes services as a set of endpoints operating on messages containing either document-oriented or procedure-oriented information.

In languages such as WSDL, the operations and messages are described abstractly, and then bound to a concrete network protocol and message format to define an endpoint. Related concrete endpoints are combined into abstract endpoints (i.e., the "services"). WSDL is extensible in order to provide a description of endpoints and their messages regardless of what message formats or network protocols are used to communicate. Accordingly, WSDL is an example of a XML (eXtensible Markup Language) Service Definition (XSD) format.

Using the WSDL language to define services provides a powerful and effective tool. However, the WSDL language is not easily readable by humans. As a result, programmers must prepare technical documentation in order to describe and explain the service interfaces to other programmers. An enterprise might prepare technical documentation using word processing software (e.g., Microsoft Word documents), spreadsheets (e.g., Microsoft Excel sheets), or flow diagrams (e.g., Visio files), for example. The process of generating the documentation is time consuming because the documentation is prepared from scratch. Moreover, since services may evolve over time, programmers must update the documentation because, in order for programmers to easily understand and efficiently update content, documentation is needed that accurately reflects the current content that is being used by an enterprise.

Furthermore, when building enterprise SOA services, the services must be standardized. To maintain consistency between services, the technical documentation must be updated regularly when requirements change and a service is updated. Services must also be controlled such that services are not made available until proper technical documentation has been prepared. For example, an enterprise that stores content in an Enterprise Service Repository (ESR) might require technical documentation in multiple formats (e.g., Word, Excel, and Visio) to be prepared for each service before it can be implemented in the ESR. Often, since the technical documentation is prepared in multiple formats, the documentation contains redundant data. Moreover, manually preparing and continually updating the technical documentation is a time consuming and error-prone process.

Therefore, conventional techniques for manually preparing and updating technical documentation suffer from one or more drawbacks, such as those highlighted above. In view of the foregoing, there is a need for improved systems and methods for automatically generating technical documentation from enterprise SOA content.

SUMMARY

Consistent with an embodiment of the present invention, a computer-implemented method is provided for generating technical documentation from enterprise SOA content. The method may comprise receiving an identifier of a service interface description. The service interface description may define an interface for implementing a service. The method may further include processing one or more packages associated with the service interface description by reading, from a database, data from one or more files storing enterprise SOA content. The technical documentation may be generated using the data read from the one or more files.

Consistent with another embodiment of the present invention, a computerized system is provided for generating technical documentation from enterprise SOA content. The system may comprise a database and a server. The server may be adapted to receive an identifier of a service interface description that defines an interface for implementing a service. The server may process one or more packages associated with the service interface description by reading data from the database from one or more files storing enterprise SOA content. In addition, the server may generate the technical documentation using the data read from the one or more files.

Consistent with yet another embodiment of the present invention, a computer-readable medium is provided that stores program instructions for implementing methods consistent with embodiments of the invention, such as the above-described method.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
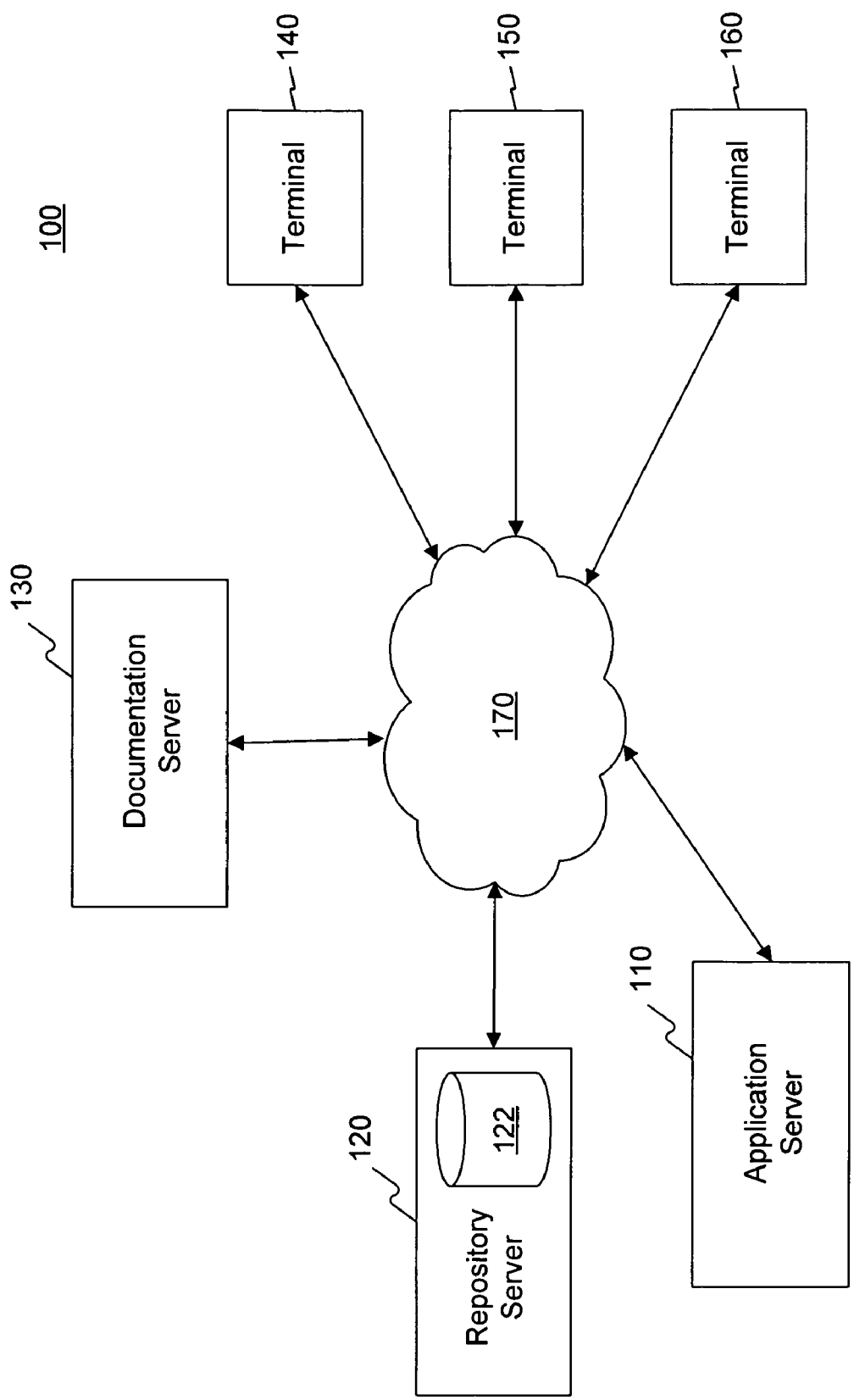
FIG. 1 is an exemplary system for generating technical documentation from enterprise SOA content, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present invention provide computerized systems and methods for generating technical documentation from enterprise service-oriented architecture (SOA) content. As used herein, the term "content" shall include enterprise services, program code, and/or other data, which may be stored in a repository. For example, content may be stored in the repository in an XML Service Definition (XSD) format, such as Web-Service Definition Language (WSDL). Additionally, interfaces for implementing services may be stored in the repository in an XSD format.

Embodiments consistent with the present invention provide systems and methods for generating technical documentation using, for example, an XSD description of a service. Systems and methods disclosed herein generate technical documentation automatically by reading content, such as an XSD description of a service, and converting the content into user readable files. The user readable files may be, for example, Microsoft Office files, such as Word, Excel, and Visio file formats. Disclosed embodiments allow programmers to create enterprise SOA content and then automatically generate technical documentation for the content. Accordingly, programmers do not need to manually create or update technical documentation for enterprise SOA content due to design changes and software updates.

FIG. 1 illustrates an exemplary system 100 for generating technical documentation from enterprise SOA content, consistent with an embodiment of the present invention. As shown in system 100, application server 110, repository server 120, documentation server 130, and terminals 140, 150, and 160 are connected to a network 170. One of skill in the art will appreciate that although three kinds of servers and three terminals are depicted in FIG. 1, any number of servers and terminals may be provided. Furthermore, one of ordinary skill in the art will recognize that functions provided by one or more components of system 100 may be combined. For example, application server 110 and repository server 120 may be implemented as one server.

Network 170 provides communications between the various entities in system 100, such as application server 110, repository server 120, documentation server 130, and terminals 140-160. In addition, application server 110, repository server 120, documentation server 130, and/or terminals 140-160 may access legacy systems and/or databases (not shown) via network 170, or may directly access legacy systems and/or databases. Network 170 may comprise any suitable combination of a shared, public, and/or private networks and may encompass a wide area or local area. For example, network 170 may be implemented through any suitable combination of wired and/or wireless communication networks. Furthermore, network 170 may comprise a local area network (LAN), a wide area network (WAN), an intranet, and/or the Internet.

Application server 110 may comprise a general purpose computer (e.g., a personal computer, network computer, server, or mainframe computer) having a processor (not shown) that may be selectively activated or reconfigured by a computer program. Application server 110 may interface with repository server 120, documentation server 130, and/or terminals 140-160. Furthermore, application server 110 may distribute content to terminals 140-160. For example, application server 110 may retrieve content from repository server 120 for transmission over network 170 to terminals 140-160.

Repository server 120 may include a database 122. Database 122 may be implemented using one or more of a number of commercially available repositories. However, in a preferred embodiment, the Enterprise Services Repository from SAP AG (Walldorf, Germany) is used. Furthermore, repository server 120 may employ any of a number of commercially available database systems, such as Microsoft Access, dbase, Oracle, Sybase, etc. Database 122 may also store definitions of interfaces that implement services. In one embodiment, interfaces are stored in an XSD format. However, other embodiments of the present invention may store interfaces in any other appropriate format.

Interfaces are made up of one or more "service interface descriptions." In turn, service interface descriptions include data types. Service interface descriptions and data types may be stored in an XSD format, for example. An example of a data type is "address." The "address" data type can be used in one or more service interface descriptions. For example, "address" may be used by a service interface description "Create PO" and a service interface description "Create Invoice." In the following discussion, the term "service interface description" refers to an interface structure. Furthermore, a service interface description may define the structure of an interface stored in database 112. For example, a "service interface description" may be called a "message data type," as used in the Enterprise Service Repository, available from SAP AG of Walldorf, Germany.

Data types that are included in a message data may have different levels of complexity. For example, at a basic level, one data type that may be defined for a service interface description is an "element." Examples of elements that may be provided as a basic level of a data type include, for instance, the data type "address." Database 112 may also store additional information for a service interface description, such as information defining "entities" included in a service interface description. "Entities" refer to structural elements of a service interface description. For example, the data types "Create PO" and "Create Invoice" may be implemented as entities. Database 112 may also store additional structuring information, such as information defining "packages." "Packages" refer to groupings of more than one entity. Furthermore, database 112 may store information identifying which entities and elements belong to which package. Accordingly, database 112 may store service interface descriptions, as well as information defining elements, entities, and packages that may be associated with a particular service interface description.

Repository server 120 may be available via network 170 and may interact with software executing on application server 110 and/or or with software executing on terminals 140-160. For example, content stored in database 122 may be accessed by application server 110 and/or terminals 140-160. Furthermore, content may be retrieved from database 122 and transmitted over network 170 to one or more of terminals 140-160 at the direction of application server 110, for example.

Collectively, application server 110 and repository server 120 may implement an exchange infrastructure. In one embodiment, application server 110 and repository server 120 may constitute an exchange infrastructure (XI) system, such as a SAP XI system. An XI system may provide a collection of services that are available to an enterprise. Details of an exemplary XI system are provided in PCT International Publication Number WO 2003/083600 A2, filed Oct. 9, 2003, which is hereby incorporated by reference in its entirety.

In operation, documentation server 130 may generate technical documentation from content that is stored in repository server 120. In one embodiment, documentation server 130 may directly generate technical documentation in a standard format, such as hypertext markup language (HTML) or unified modeling language (UML), which can later be imported by one or more applications such as Microsoft Office applications, for example. In another embodiment, documentation server 130 may interact with one or more applications via application programming interfaces (APIs) in order to create files such as Microsoft Excel sheets or Microsoft Word documents, for example. APIs to Microsoft Office applications may enable documentation server 130 to generate files of a specific format. In one embodiment, APIs may be stored in documentation server 130. In yet another embodiment, documentation server 130 may generate Microsoft Office and/or other files from HTML or UML files that were previously generated.

Terminals 140-160 may be any type device for communicating with application server 110 and/or repository server 120 over network 170. For example, terminals 140-160 may be personal computers, handheld devices, and/or any other appropriate computing platform or device capable of exchanging data with network 170. Terminals 140-160 may each include a processor (not shown) and data storage (not shown) for storing data. For example, terminals 140-160 may execute program modules that provide one or more graphical user interfaces (GUIs) for interacting with network resources in order to access one or more services provided by application server 110 and repository server 120. Users of terminals 140-160 may access services via network 170 through a web browser or software application running on, for example, any one of terminals 140-160.

Figure 2:
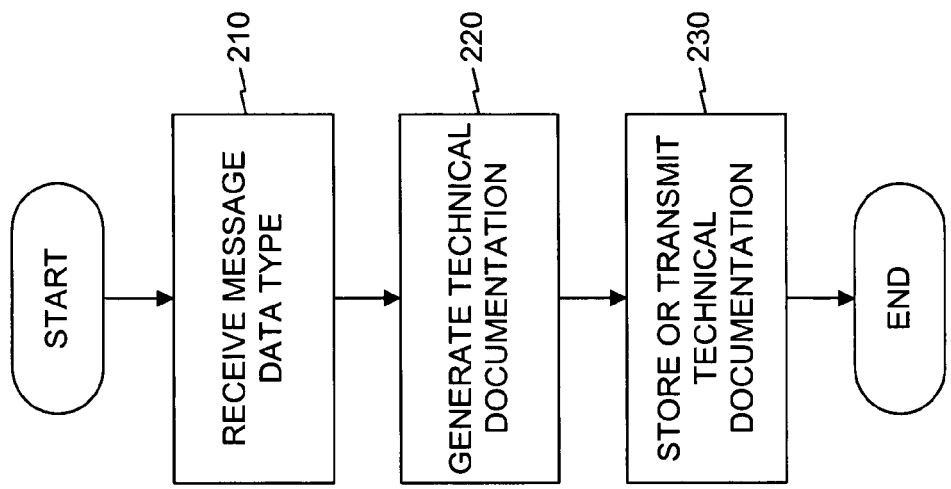
FIG. 2 is a flow diagram of an exemplary method for generating technical documentation from enterprise SOA content, consistent with an embodiment of the present invention.

FIG. 2 is a flow diagram 200 of an exemplary method for generating technical documentation from enterprise SOA content, consistent with an embodiment of the present invention. In particular, FIG. 2 provides an overview of a method for generating technical documentation with documentation server 130. For example, documentation server 130 may generate technical documentation for content stored in repository server 120 in one or more formats.

At the start of the process, in step 210, documentation server 130 receives an identifier (e.g., a name) of a service interface description for which the documentation should be generated. The identifier for the service interface description may be specified by a user at one of terminals 140-160, for example. Alternatively, in order to keep technical documentation up to date, documentation server 130 may automatically update technical documentation according to a predetermined schedule (e.g., hourly, daily, monthly, etc). For example, technical documentation may be kept up to date for one or more service interface descriptions by automatically updating the documentation when specific events or times occur.

In step 220, documentation server 130 generates technical documentation for the received service interface description identifier. For example, during step 220, documentation server 130 may generate an introduction for the document, as well as sections corresponding to elements, entities, and packages of a particular service interface description. Furthermore, documentation server 130 may directly generate technical documentation in a standard format, such as hypertext markup language (HTML) or unified modelling language (UML), which can later be imported by one or more applications such as Microsoft Office applications, for example. In another embodiment, documentation server 130 may interact with one or more applications via application programming interfaces (APIs) in order to create files such as Microsoft Excel sheets or Word documents, for example. In yet another embodiment, documentation server 130 may generate Microsoft Office files from HTML or UML files that were previously generated. Further details and embodiments concerning generating technical documentation are provided below.

In step 230, documentation server 130 may store the generated technical documentation and/or may transmit the generated technical documentation over network 170 to, for example, application server 110 and/or terminals 140-160. The generated technical documentation may be in a standard format, such as HTL or UML, or may be in a commercially available format, such as Microsoft Office format.

To generate technical documentation (step 220), documentation server 130 may execute one or more program modules corresponding to the above-noted functions and sub-functions. For example, documentation server 130 may generate an introduction for the technical documentation and then process one or more packages. For each package, documentation server 130 may generate a package chapter and a package definition. Furthermore, during execution, documentation server 130 may interface with database 122 of repository server 120.

Consistent with embodiments of the invention, documentation server 130 may also obtain and process the entities for each package and any sub-packages. For each entity, documentation server 130 may generate an entity chapter, entity definition, and an entity structure. Documentation server 130 may also obtain and process the elements for each entity. That is, for each element, documentation server 130 may create an element chapter and an element definition, as well as process any sub-entities. One of ordinary skill in the art will appreciate that one or more data types may be omitted in certain embodiments of the present invention, depending upon the complexity of a particular service interface description.

For purposes of illustration, the following is a listing of exemplary pseudo code that outlines the processing that may be performed by documentation server 130 to generate technical documentation for a service interface description:

```
main( )
{
    write introduction( )
    process_packages(root_package)
    extract_GDTs( )
}
process packages(packages)
{
    LOOP AT packages INTO package.
        create package chapter(package)
        create package definition(package).
        entities = get entities(package).
        process entities(entities)
        subpackages = get subpackages(package).
        process packages(subpackages).
    ENDLOOP.
}
process entities(entities)
{
    LOOP AT entities INTO entity.
        create entity chapter (entity)
        create entity definition(entity).
        create entity structure(entity).
        elements = get elements(entity).
        LOOP AT elements INTO element.
            create element chapter(element)
            create element definition(element).
            occurrence(element).
        ENDLOOP.
        subentities = get subentities(entity)
        process entities(subentities)
    ENDLOOP.
}
```

Figure 3:
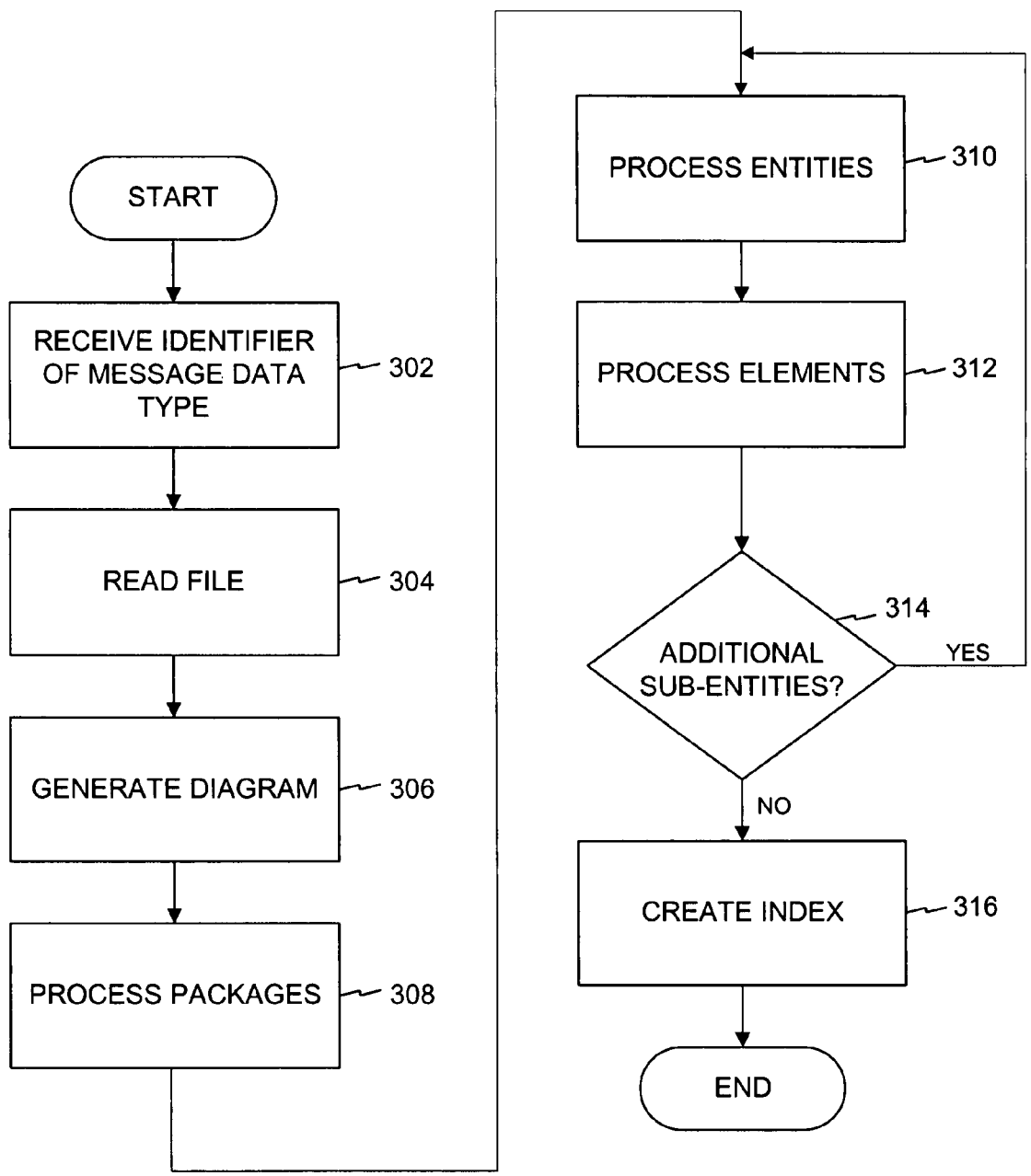
FIG. 3 is a flow diagram of another exemplary method for generating technical documentation, consistent with an embodiment of the present invention.

FIG. 3 is a flow diagram 300 of another exemplary method for generating technical documentation, consistent with an embodiment of the present invention. The exemplary method of FIG. 3 may be implemented to automatically generate technical documentation for a service interface description. While the following process is described with reference to generating a word processing document (e.g., a Microsoft Word file), the process may be adapted for generating other kinds of documentation, as discussed below in further detail.

In step 302, documentation server 130 receives an identifier of the service interface description. Documentation server 130 may receive the identifier of the service interface description from, for example, any one of terminals 140-160. As discussed above, a user may request documentation for a particular service interface description at one of terminals 140-160 or, alternatively, in order to keep technical documentation up to date, documentation server 130 may automatically update technical documentation according to a predetermined schedule (e.g., hourly, daily, monthly, etc).

In step 304, documentation server 130 reads information from a file (e.g., an XSD file) corresponding to the identified service interface description. Documentation server 130 may read the XSD file from database 122 of repository server 120, for example, or, alternatively, from any other appropriate source over network 170. From the XSD file, documentation server 130 may create an introduction of a technical document, such as a word processing document, using the definition of the service interface description. For example, the introduction may indicate the service interface description and provide one or more sentences indicating that the document provides details of the service interface description.

Next, in step 306, documentation server 130 generates a UML diagram from the interface structure and attaches it to the introduction. The process of generating a UML diagram may incorporate one or more steps discussed below in connection with FIG. 7 in more detail. The UML diagram may be inserted into the document as, for example, an image in any appropriate format, such as .gif, .jpeg, etc.

Next, in step 308, documentation server 130 reads information from the XSD file to identify any packages corresponding to the service interface description. As discussed above, packages may include groupings of entities. In this step, documentation server 130 may create a chapter in the document that corresponds to each package. For example, in a word processing document, the document may include a header (e.g., of a particular size font, in bold and/or underlined, etc.) corresponding to the chapter. Furthermore, documentation server 130 may use the package definition to create the introduction for each package chapter. That is, the package definition may be read by documentation server 310 and inserted into the document after the header for the package. Documentation server 130 may read all entities belonging to each package from database 122. Furthermore, documentation server 130 may create a list of all sub packages used within a package as part of the introduction of the package chapter and a list of all entities used within a package as part of the introduction of the package chapter.

In step 310, documentation server 130 creates, within each package chapter, one sub chapter for each entity of the package. In this step, documentation server 130 may use the definitions of entities to create the introduction of the entity chapter. Documentation server 130 may read all elements belonging to an entity and create, within each entity chapter, a section for each element. Furthermore, documentation server 130 may retrieve from database 122, for each element, a corresponding data type.

In step 312, documentation server 130 reads for each element the cardinality or number of occurrences of each element. For example, the element may not be required of a particular service interface description and occurs once at maximum (indicating a cardinality of a node of 0 . . . 1), the element may be required of the service interface description and occurs exactly once (indicating a cardinality of 1), the element may be optional but may occur several times (a cardinality of 0 . . . n), or at least one of the element must be provided (a cardinality of 1 . . . n). In this step, documentation server 130 may create an element section, including the information defined the data type and occurrence, as well as the element definitions or the data type definitions. Documentation server 130 may read all sub-entities being part of the currently processed entity and create, within the entity chapter, a chapter for each of the sub entities of the currently processed entity.

In step 314, if there are additional sub-entities, then steps 310 and 312 are repeated. If there are no further sub-entities requiring processing, then the process proceeds to step 316.

In step 316, documentation server 130 browses the document for all data types being used and creates an additional chapter featuring a list of the data types. For example, the list may be formatted as an index or table of contents, indicating which page or pages of the document refer to particular data types. Furthermore, documentation server 130 may eliminate duplicates such that each data type appears once in the list.

The exemplary process of FIG. 3 may be modified depending on the desired structure of the document or the given SOA content structure. For example, if packages are not used, the steps referring to packages may be omitted. Accordingly, one of ordinary skill in the art will appreciate that modifications may be made while keeping with the spirit and scope of the present invention.

For purposes of illustration, the following is a exemplary listing of a portion of technical documentation that may be produced according to the above-described methodology of FIG. 3:

1 FinancialAccountingViewOfProject Interface(s)
1.1 Motivating Business Scenario
In the context of the Composite Project Change Request the FinancialAccountingViewOfProject provides the accounting master data and budget information related to a Project.
1.2 Message Types
1.2.1 FinancialAccountingViewOfProjectByIDQuery_sync
Definition
A FinancialAccountingViewOfProjectByIDQuery_sync is a request to return the elements of a specific FinancialAccountingViewOfProject including elements related to budget information.
Structure
The structure of the message type FinancialAccountingViewOfProjectByIDQuery_sync is specified by the message data type FinancialAccountingViewOfProjectByIDQueryMessage_sync, which is derived from the service interface description FinancialAccountingViewOfProjectMessage_sync.
1.2.2 FinancialAccountingViewOfProjectByIDResponse_sync
Definition
A FinancialAccountingViewOfProjectByIDResponse_sync is the response to a FinancialAccountingViewOfProjectByIDQuery_sync.
Structure
The structure of the message type FinancialAccountingViewOfProjectByIDResponse_sync is specified by the service interface description FinancialAccountingViewOfProjectByIDResponseMessage_sync, which is derived from the service interface description FinancialAccountingViewOfProjectMessage_sync.

Figure 4:
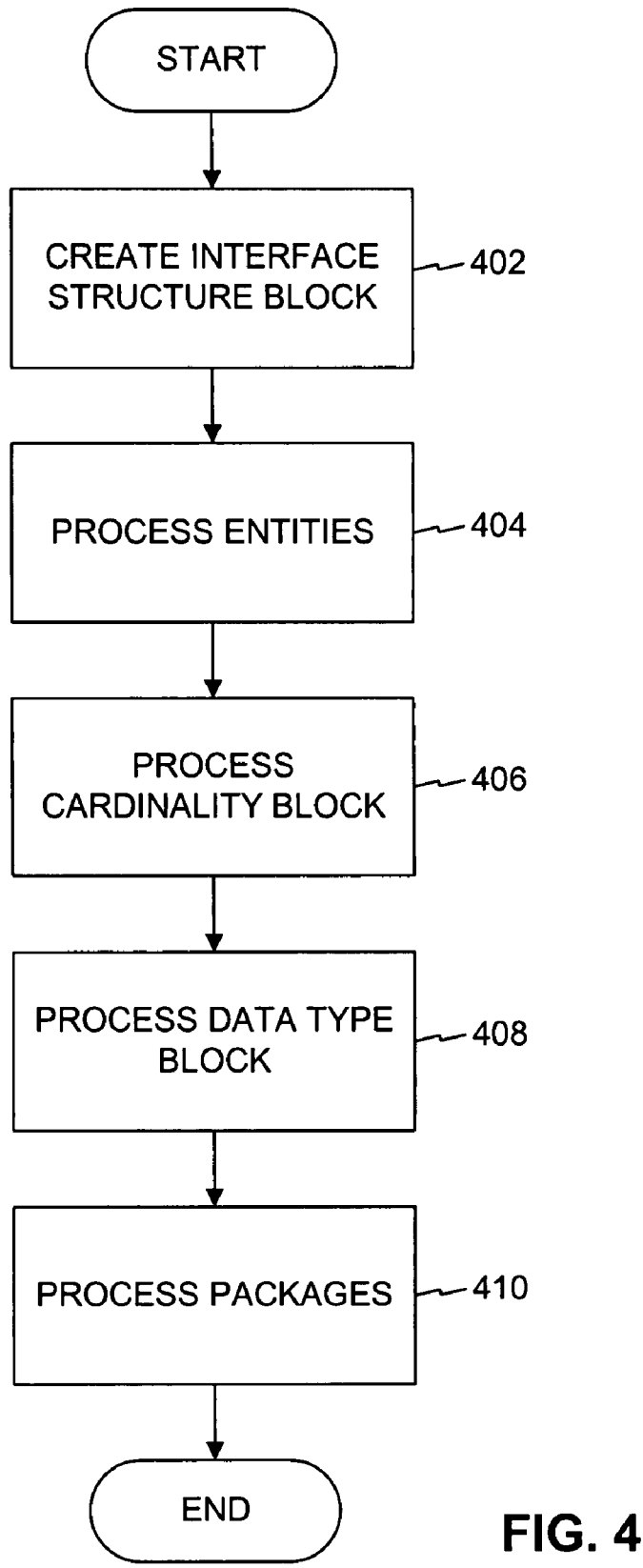
FIG. 4 is a flow diagram of an exemplary method for generating technical documentation in a spreadsheet format, consistent with an embodiment of the present invention.

FIG. 4 is a diagram 400 of an exemplary method for generating technical documentation in a spreadsheet format, consistent with an embodiment of the present invention. As discussed above, the documentation may be visualized on a spreadsheet (e.g., Microsoft Excel) in lieu of a word processing document. For example, in one embodiment, an interface structure block may start in column m of a spreadsheet, a data type block may start in column p, a cardinality block may start in column q, and a package block may start in column r.

At the start of the process, in step 402, documentation server 130 creates an interface structure block, which designates the structure of the service interface description. For example, documentation server 130 may create a cell in line m and column n of the spreadsheet. In one embodiment, the value of m should exceed r plus the number of levels of the service interface description to provide sufficient space to the left of the generated structure for additional information. The value of r may be chosen arbitrarily and specifies the horizontal position of the service interface description representation within the spreadsheet. The value of m may also be chosen arbitrarily and specifies the vertical position of the service interface description representation within the spreadsheet. This cell is referred to in the following as a "service interface description cell" and stores the name of the service interface description.

In step 404, documentation server 130 identifies and reads all entities at the first level of the service interface description. Next, in step 406, documentation server 130 inserts a line below the service interface description cell for each entity. At each line, documentation server 130 creates a cell in column n+1. This cell is referred to as "entity cell" and stores the entity's name. In this step, documentation server 130 may read all sub-entities of each entity cell (e.g., column i, line j). Documentation server 130 may also create a line below line i for each sub-entity. At each new line, documentation server 130 may create a cell in column j+1. This cell is referred to as the "entity cell" in the following discussion and stores the entity's name. For all entity cells, documentation server 130 may read all elements belonging to an entity. Documentation server 130 may insert a new line below the entity cell for each element of an entity. For example, an entity cell is located in column k and, accordingly, documentation server 130 creates in column k+1 a cell in each line containing the name of the corresponding element. This cell is referred to as the "element cell" in the following discussion.

Next, in step 406, documentation server 130 creates a cardinality block. To do so, documentation server 130 may fill a cell in column q with information specifying the cardinality of each entity or element. For example, if q is chosen to be greater than m plus the number of levels of the service interface description, none of the existing cells are overwritten.

In step 408, documentation server 130 creates a data type block. To do so, documentation server 130 may fill a cell in column p for each element cell. The cell may include information specifying the data type associated with the element. For example, if p is chosen to be greater q, none of the existing cells are overwritten. In this step, further columns may be added to the spreadsheet, if necessary.

In step 410, documentation server 130 creates a package block. For each entity cell or element cell that was read by documentation server 130, documentation server 130 may read the package it belongs to as well as all higher level packages of the entity or element. In this step, for example, starting in column r, documentation server 130 may create in the line corresponding to the cell, one cell for each package containing the package name, starting with the top level package. These cells are referred to as "package cells." Furthermore, documentation server 130 may fill every package cell with a color corresponding to a specific package. For example, certain cells sharing common or related elements, such as packages, may be coded with a common background color. Furthermore, documentation server 130 may assume that s equals the number of package levels in the service interface description and, accordingly, fill all cells of each line between the column containing the outer right package cell and including column r+s with the color corresponding to the outer right package cell in this line.

Documentation server 130 may store the spreadsheet and/or may transmit the spreadsheet over network 170 to, for example, application server 110 and/or terminals 140-160. Furthermore, one of ordinary skill in the art will appreciate that one or more steps may be omitted and/or substituted from the foregoing discussion in accordance with a desired layout of the spreadsheet.

Figure 5:
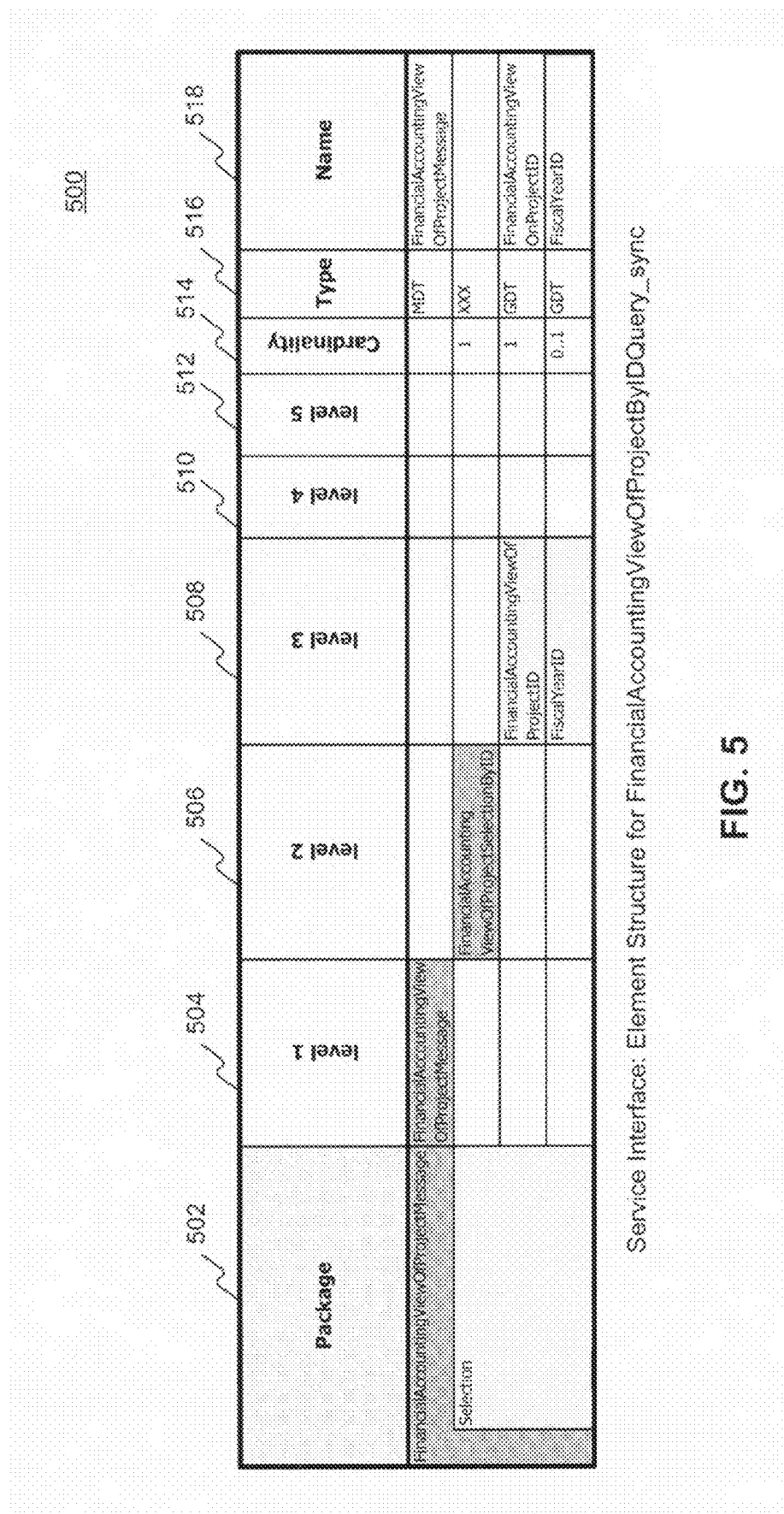
FIG. 5 is an exemplary spreadsheet providing technical documentation, consistent with an embodiment of the present invention.

FIG. 5 is an exemplary spreadsheet 500, consistent with an embodiment of the present invention. Documentation server 130 may generate spreadsheet 500 according to the exemplary method of FIG. 4, for example. As illustrated in FIG. 5, spreadsheet 500 may include a column 502 listing package names, columns 504-512 including information for levels 1 through 5, column 514 including the cardinality of each element, column 516 including the type of each element (e.g., Message Display Tool (MDT), Global Data Type (GDT), or none), and a column 518 indicating a name or ID of each element. As also shown in FIG. 5, spreadsheet 500 may be shaded or color coded to indicate relationships between data types.

Figure 6:
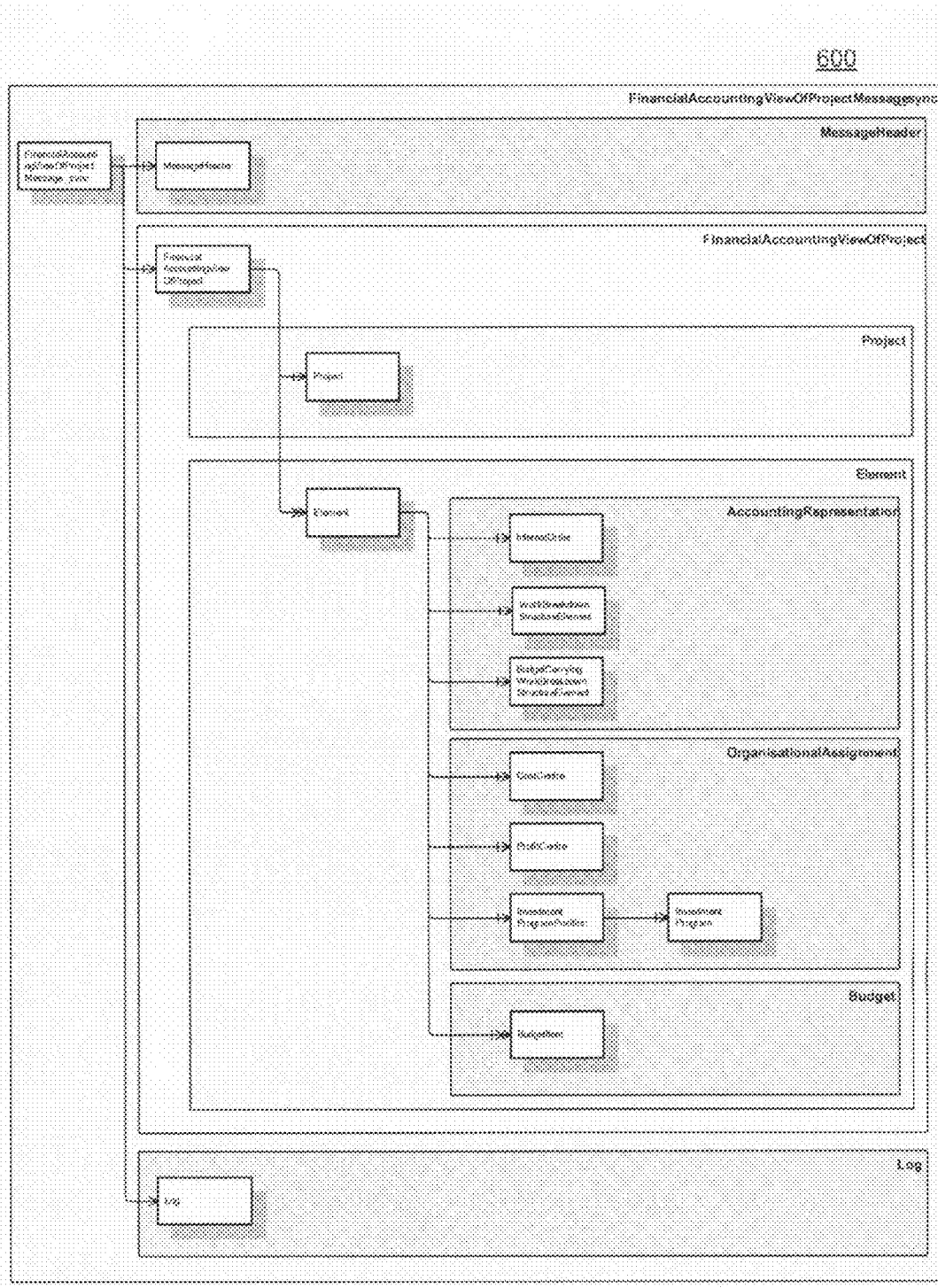
FIG. 6 is an exemplary diagram providing technical documentation, consistent with an embodiment of the present invention.

FIG. 6 is an exemplary diagram 600 providing technical documentation, consistent with an embodiment of the present invention. Documentation server 130 may generate diagram 600 according to method discussed in connection with FIG. 4, for example. Although the methodology of FIG. 4 was described in connection with generating a spreadsheet, the method may be adapted to generate a UML diagram, as shown in FIG. 6. Furthermore, a method for generating technical documentation in the form of a UML diagram is described in more detail in connection with FIG. 7.

Figure 7:
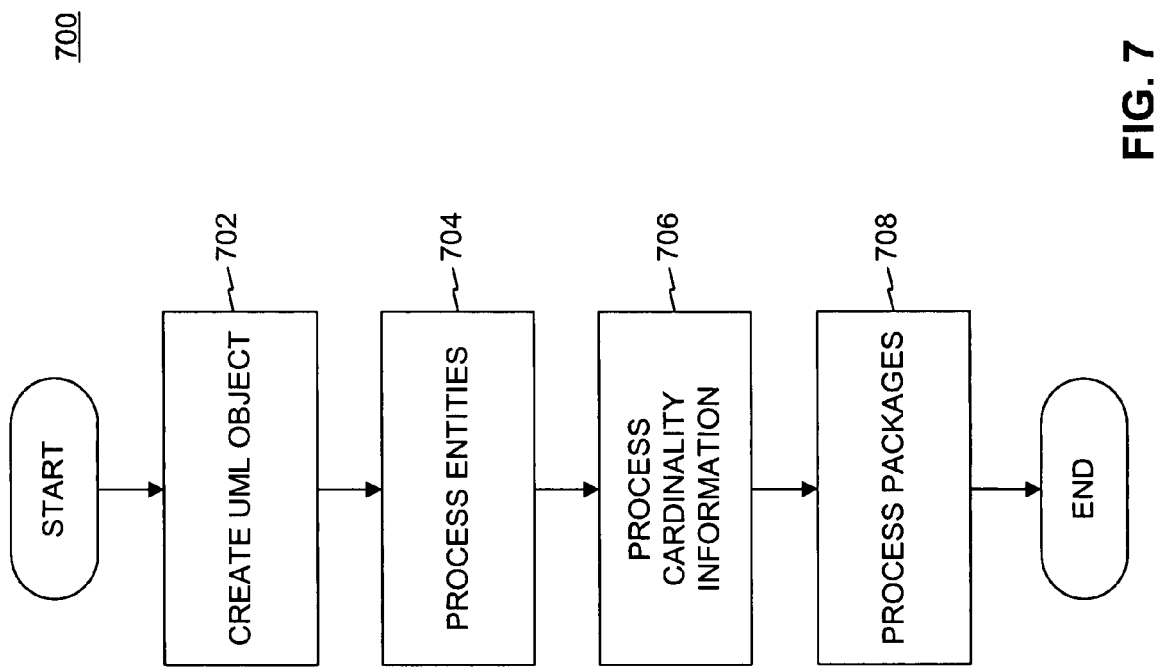
FIG. 7 is a flow diagram of an exemplary method for generating technical documentation in a UML diagram format, consistent with an embodiment of the present invention.

FIG. 7 is a flow diagram 700 of an exemplary method for generating technical documentation in a UML diagram format, consistent with an embodiment of the present invention. In the following, documentation server 130 may use an API that allows for the creation and editing of UML objects within a diagram via the API.

At the start of the process, in step 702, documentation server 130 creates an UML object representing the service interface description. This object is referred to as a "service interface description UML object" in the following.

Next, in step 704, documentation server 130 identifies and reads all entities at a first level of the service interface description. Documentation server 130 may insert, for each entity, an UML object at the right side of the UML object representing the service interface description. This UML object is referred to as "entity UML object" in the following discussion. The entity UML object contains the entity's name and the UML object may be connected to the service interface description object via a symbol representing an association (e.g., a line). In this step, documentation server 130 may read all sub-entities of each entity. Documentation server 130 may also read an entity object for each sub entity of a given entity and place it at the right side of this entity and connect it to the entity via an association symbol. This process may be repeated until no new sub-entities are found for all entities. In contrary to generating a spreadsheet, elements will, in general, typically not be part of the UML diagram.

Next, in step 706, documentation server 130 creates cardinality information in the UML diagram cardinality block. To do so, documentation server 130 may edit the association of an entity to its parent entity so that it reflects the cardinality of the entity.

In step 708, documentation server 130 creates a UML object for one or more packages present in the service interface description. A UML object of this kind is referred to as a "package UML object" in the following. The package UML object may be considerably larger than the entity UML object such that a package UML object can contain one or more entity UML objects. Furthermore, the package UML objects may contain the name of the package and may be placed in the diagram such that they graphically comprise all entities that are part of a package and its sub-packages and do not graphically comprise all entities that are not part of the package or sub-packages. In order to increase the readability of the documentation a package UML object can, for example, be colored in a way that corresponds to the color used for this package in the spreadsheet representation.

Documentation server 130 may store the UML and/or may transmit the spreadsheet over network 170 to, for example, application server 110 and/or terminals 140-160. Also, the UML diagram may be included in the text document, discussed above. Furthermore, one of ordinary skill in the art will appreciate that one or more steps may be omitted and/or substituted from the foregoing discussion in accordance with a desired layout of the UML diagram.

As discussed above, documentation server 130 may generate technical documentation from content that is stored in repository server 120. For example, documentation server 130 may directly generate technical documentation in a standard format, such as hypertext markup language (HTML) or unified modeling language (UML), which can later be imported by one or more applications such as Microsoft Office applications, for example. Documentation server 130 may also interact with one or more applications via application programming interfaces (APIs) in order to create files such as Microsoft Excel sheets or Word documents, for example. Still further, documentation server 130 may generate Microsoft Office files from HTML or UML files that were previously generated. While described in connection with generating technical documentation from service-oriented architecture content, one of ordinary skill in the art will appreciate that the present invention may generate technical documentation for other documentation, such as content stored in other formats.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for generating technical documentation from enterprise SOA content, the method comprising:
receiving an identifier of a service interface description, the service interface description defining an interface for implementing a service;
processing one or more packages associated with the service interface description, wherein the processing comprises:
reading, from a database, data from one or more files storing enterprise SOA content;
generating a chapter for each of the one or more packages;
generating a package definition for each of the one or more packages; and
processing one or more entities for each of the one or more packages; and
generating the technical documentation using the data read from the one or more files.

2. The method of claim 1, further comprising:
generating an introduction using the service interface description; and
inserting the introduction into the generated technical documentation.

3. The method of claim 1, wherein processing one or more entities includes:
generating a chapter for each of the one or more entities;
generating an entity definition for each of the one or more entities; and
processing elements of each of the one or more entities.

4. The method of claim 3, wherein processing one or more elements includes:
generating a chapter for each of the one or more elements; and
generating an element definition for each of the one or more elements.

5. The method of claim 1, further comprising:
generating a diagram representing the structure of the service interface description; and
inserting the diagram into the technical documentation.

6. The method of claim 5, wherein the diagram is inserted into the technical documentation following the introduction.

7. The method of claim 1, further comprising:
generating a spreadsheet representing the structure of the service interface description.

8. The method of claim 7, wherein cells of the spreadsheet are shaded or colored to group the entities and elements belonging to one of the packages.

9. A system for generating technical documentation for enterprise SOA content, the system comprising:
a database; and
a server, the server adapted to:
receive an identifier of a service interface description that defines an interface for implementing a service;
process one or more packages associated with the service interface description, wherein the processing comprises:
reading, from the database, data from one or more files storing enterprise SOA content;
generating a chapter for each of the one or more packages;
generating a package definition for each of the one or more packages; and
processing one or more entities for each of the one or more packages; and
generate the technical documentation using the data read from the one or more files.

10. The system of claim 9, wherein the server is further adapted to:
generate an introduction using the service interface description; and
insert the introduction into the generated technical documentation.

11. The system of claim 9, wherein the server is further adapted to:
generate a chapter for each of the one or more entities;
generate an entity definition for each of the one or more entities; and
process elements of each of the one or more entities.

12. The system of claim 11, wherein the server is further adapted to:
generate a chapter for each of the one or more elements; and
generate an element definition for each of the one or more elements.

13. The system of claim 9, wherein the server is further adapted to:
generate a diagram representing the structure of the service interface description; and
insert the diagram into the technical documentation.

14. The system of claim 13, wherein the diagram is inserted into the technical documentation following the introduction.

15. The system of claim 9, wherein the server is further adapted to:
generate a spreadsheet representing the structure of the service interface description.

16. The system of claim 15, wherein cells of the spreadsheet are shaded or colored to group the entities and elements belonging to one of the packages.

17. A computer-readable storage medium comprising programmable instructions adapted to perform a computer-implemented method for generating technical documentation for enterprise SOA content, the method comprising:
receiving an identifier of a service interface description, the service interface description defining an interface for implementing a service;
processing one or more packages associated with the service interface description, wherein the processing comprises:
reading, from a database, data from one or more files storing enterprise SOA content;
generating a chapter for each of the one or more packages;
generating a package definition for each of the one or more packages; and
processing one or more entities for each of the one or more packages; and
generating the technical documentation using the data read from the one or more files.

18. The computer-readable storage medium of claim 17, further comprising:
generating an introduction using the service interface description; and
inserting the introduction into the generated technical documentation.

19. The computer-readable storage medium of claim 17, wherein processing one or more entities includes:
  generating a chapter for each of the one or more entities;
  generating an entity definition for each of the one or more entities; and
  processing elements of each of the one or more entities.

20. The computer-readable storage medium of claim 19, wherein processing one or more elements includes:
  generating a chapter for each of the one or more elements; and
  generating an element definition for each of the one or more elements.

21. The computer-readable storage medium of claim 17, further comprising:
  generating a diagram representing the structure of the service interface description; and
  inserting the diagram into the technical documentation.

22. The computer-readable storage medium of claim 21, wherein the diagram is inserted into the technical documentation following the introduction.

23. The computer-readable storage medium of claim 17, further comprising:
  generating a spreadsheet representing the structure of the service interface description.

24. The computer-readable storage medium of claim 23, wherein cells of the spreadsheet are shaded or colored to group the entities and elements belonging to one of the packages.

* * * * *